(12) United States Patent
Braunroth

(10) Patent No.: US 11,712,840 B2
(45) Date of Patent: Aug. 1, 2023

(54) APPARATUS FOR ADDITIVELY MANUFACTURING A THREE-DIMENSIONAL OBJECT

(71) Applicant: Concept Laser GmbH, Lichtenfels (DE)

(72) Inventor: Domenik Braunroth, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 116 days.

(21) Appl. No.: 16/832,407

(22) Filed: Mar. 27, 2020

(65) Prior Publication Data

US 2020/0316855 A1 Oct. 8, 2020

(30) Foreign Application Priority Data

Apr. 2, 2019 (EP) .................................... 19166767

(51) Int. Cl.
| | | |
|---|---|---|
| *B29C 64/153* | (2017.01) | |
| *B29C 64/255* | (2017.01) | |
| *B29C 64/205* | (2017.01) | |
| *B33Y 10/00* | (2015.01) | |
| *B33Y 30/00* | (2015.01) | |

(Continued)

(52) U.S. Cl.
CPC ............ *B29C 64/153* (2017.08); *B22F 10/28* (2021.01); *B22F 10/30* (2021.01); *B22F 12/55* (2021.01); *B29C 64/205* (2017.08); *B29C 64/255* (2017.08); *B29C 64/393* (2017.08); *B22F 12/67* (2021.01); *B29C 64/268* (2017.08);

(Continued)

(58) Field of Classification Search
CPC ................................................... B29C 64/205
See application file for complete search history.

(56) References Cited

U.S. PATENT DOCUMENTS 9,855,706 B2 * 1/2018 Din ......................... B33Y 30/00
11,192,301 B2 * 12/2021 Ewald ..................... B22F 12/63
(Continued)

FOREIGN PATENT DOCUMENTS

| EP | 3053730 A1 | 8/2016 |
| EP | 3165304 A1 | 5/2017 |
| WO | WO2018/194652 A1 | 10/2018 |

OTHER PUBLICATIONS

European Search Report Corresponding to EP191667674 dated Oct. 10, 2019.

*Primary Examiner* — Leith S Shafi
*Assistant Examiner* — Nicholas J Chidiac
(74) *Attorney, Agent, or Firm* — Dority & Manning, P.A.

(57) ABSTRACT

An apparatus for additively manufacturing a three-dimensional object formed by successive layerwise selective irradiation and consolidation of build material layers by at least one energy beam in a build area of the apparatus is provided, along with methods thereof. The apparatus may comprise a first build material supply device configured to supply an amount of build material to a first build material application device; wherein the first build material application device is configured to apply an amount of build material in the build area of the apparatus; and a second build material supply device configured to supply an amount of build material to a second build material application device, wherein the second build material application device is configured to apply an amount of build material to the supply area of the first build material supply device.

20 Claims, 3 Drawing Sheets

(51) Int. Cl.
*B29C 64/268* (2017.01)
*B22F 10/28* (2021.01)
*B29C 64/393* (2017.01)
*B22F 12/55* (2021.01)
*B22F 10/30* (2021.01)
*B33Y 50/02* (2015.01)
*B22F 12/67* (2021.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 11,254,056 B2* | 2/2022 | Ewald | .................... B33Y 40/00 |
| 2016/0221263 A1* | 8/2016 | Din | .......................... B28B 1/001 |
| 2017/0120521 A1 | 5/2017 | Sakura et al. | |
| 2019/0313878 A1* | 10/2019 | Dries | .................. B28B 17/0081 |
| 2021/0197470 A1* | 7/2021 | Ewald | .................... B29C 64/321 |
| 2021/0206066 A1* | 7/2021 | Ewald | .................... B29C 64/218 |
| 2022/0134665 A1* | 5/2022 | Ewald | ...................... B22F 12/50 |
| | | | 425/375 |

* cited by examiner

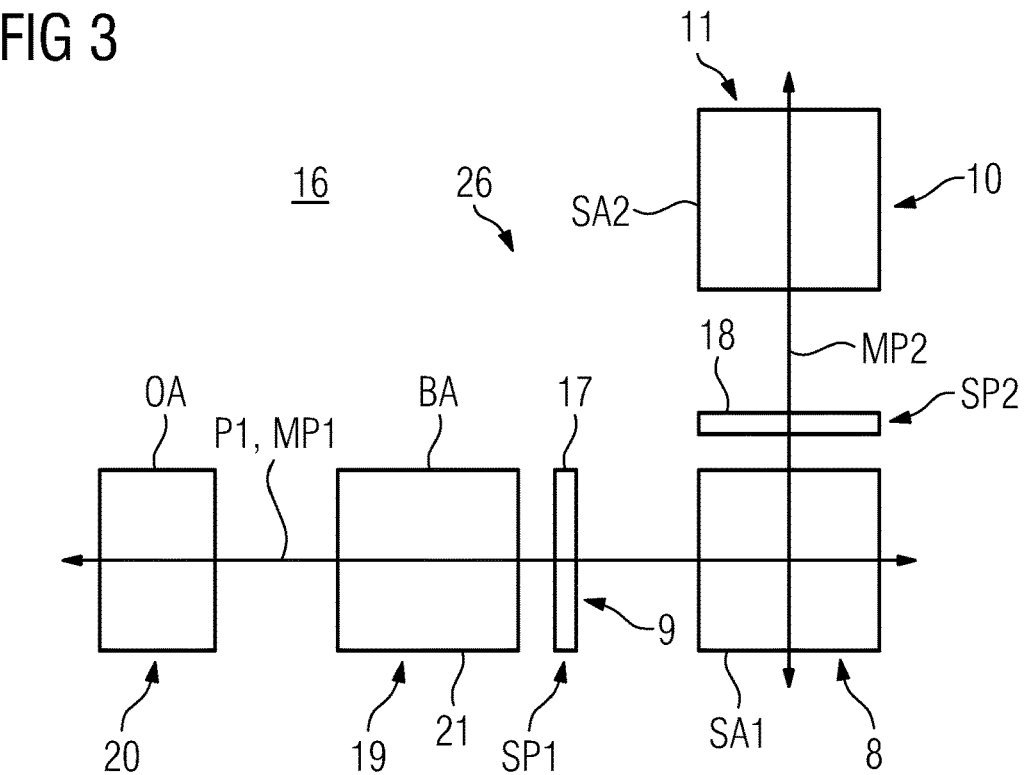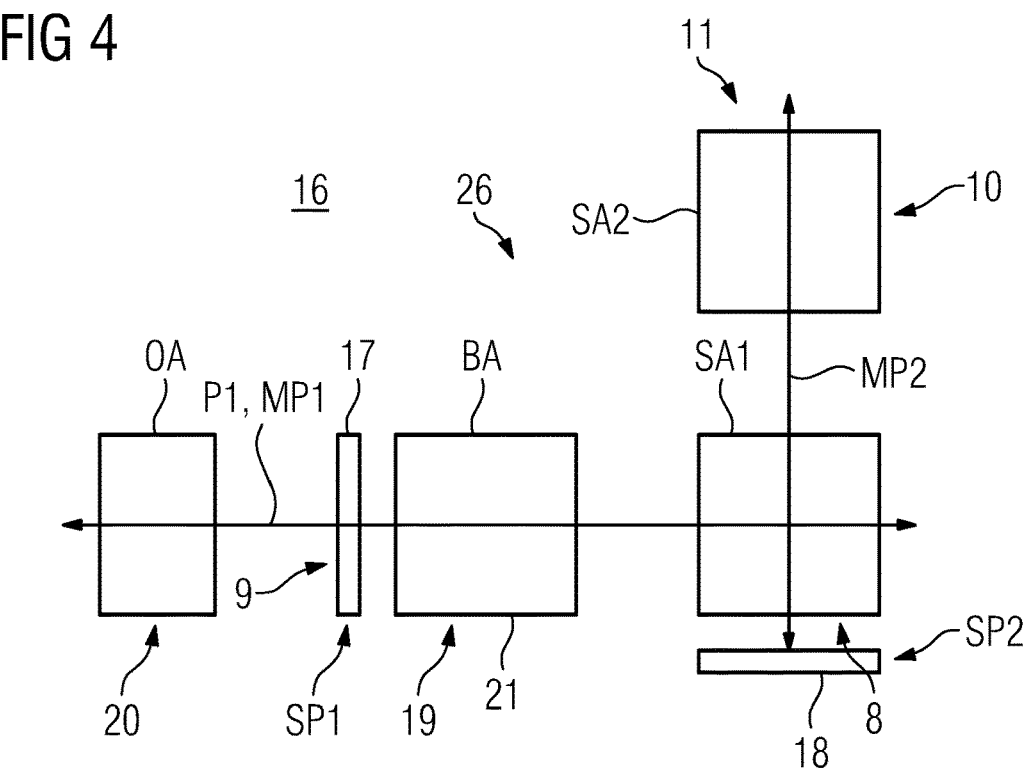

APPARATUS FOR ADDITIVELY MANUFACTURING A THREE-DIMENSIONAL OBJECT

PRIORITY INFORMATION

The present application claims priority to European Patent Application Serial Number 19166767.4 filed on Apr. 2, 2019.

FIELD OF TECHNOLOGY

The present disclosure refers to an apparatus ("additive manufacturing apparatus") for additively manufacturing a three-dimensional object by successive layerwise selective irradiation and consolidation of build material layers by means of at least one energy beam in a build area of the apparatus.

BACKGROUND

A respective additive manufacturing apparatus is generally known from prior art. Merely as an example, a respective additive manufacturing apparatus may be embodied as a selective laser melting apparatus or as a selective electron beam melting apparatus.

A respective additive manufacturing apparatus typically comprises a build material supply device configured to supply an amount of build material which is to be applied in the build area of a respective apparatus by means of a build material application device configured to apply an amount of build material supplied by the build material supply device in the build area of the apparatus so as to form a respective build material layer which is to be selectively irradiated and consolidated by means of the at least one energy beam.

The aspects of supplying and applying build material by means of respective devices are of high importance for the overall efficiency of the additive build process implemented by a respective additive manufacturing apparatus.

In order to increase efficiency of respective additive build processes, diverse approaches for supplying build material have been suggested particularly aiming at a reliable principle for avoiding interruptions of additive build processes due to changes of build material supply devices, particularly when build material storage units of respective build material supply devices are empty and need to be exchanged and/or refilled.

Hence, there is an ongoing need for efficient build material supply approaches avoiding interruptions of additive build processes due to changes of build material supply devices, particularly when build material storage units of respective build material supply devices are empty and need to be exchanged and/or refilled.

Consequently, there is a need for an additive manufacturing apparatus allowing for build material supply approaches with increased efficiency.

BRIEF DESCRIPTION

Aspects and advantages will be set forth in part in the following description, or may be obvious from the description, or may be learned through practice of the invention.

An apparatus is generally provided for additively manufacturing a three-dimensional object formed by successive layerwise selective irradiation and consolidation of build material layers by at least one energy beam in a build area of the apparatus. In one embodiment, the apparatus comprises a first build material supply device configured to supply an amount of build material to a first build material application device; wherein the first build material application device is configured to apply an amount of build material in the build area of the apparatus; and a second build material supply device configured to supply an amount of build material to a second build material application device, wherein the second build material application device is configured to apply an amount of build material to the supply area of the first build material supply device.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 3 shows a principle drawing of a build material application arrangement according to an exemplary embodiment in a top-view;

FIG. 4 shows a principle drawing of a build material application arrangement according to an exemplary embodiment in a top-view;

Figure 1:
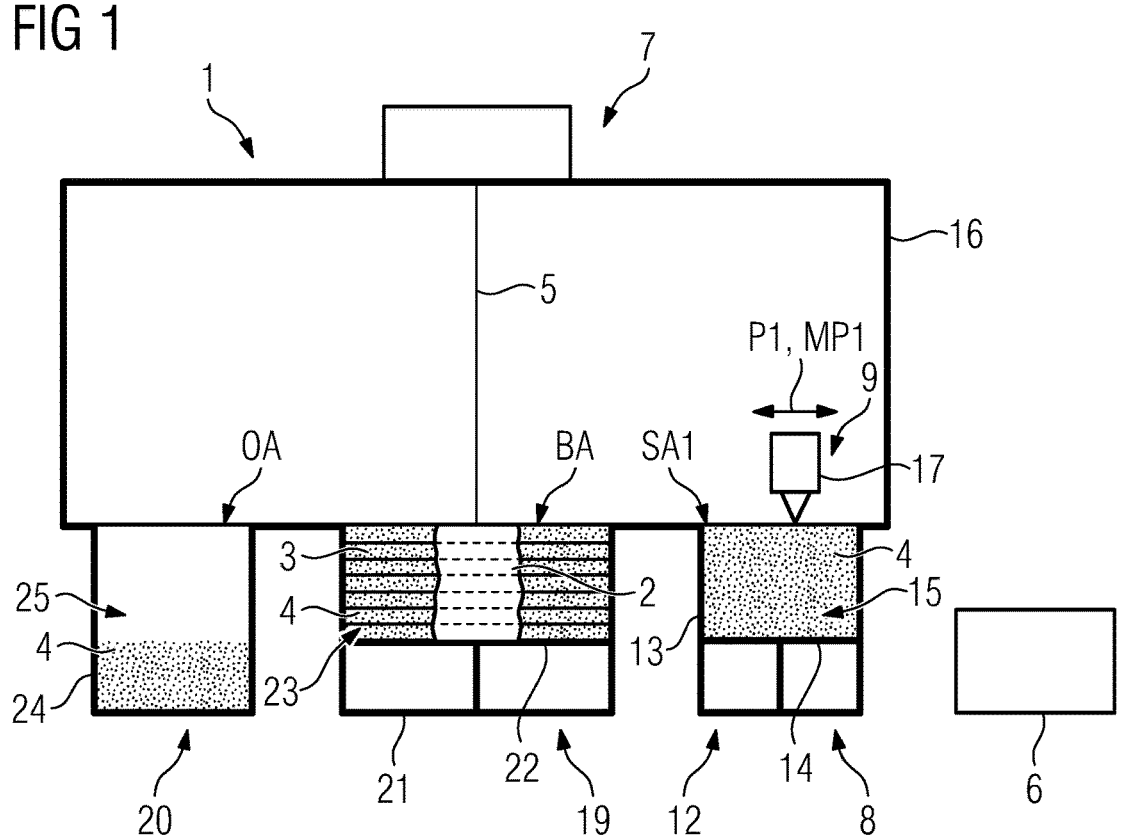
FIG. 1 shows a principle drawing of an apparatus for additively manufacturing of a three-dimensional object according to an exemplary embodiment in a frontal or side view.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An additive manufacturing apparatus is generally provided that allows for build material supply approaches with increased efficiency. An aspect of the present invention refers to an apparatus ("apparatus") for additively manufacturing at least one three-dimensional object by means of successive layerwise selective irradiation and consolidation/solidification of build material layers, i.e. of layers of a build material which can be consolidated by means of being irradiated by at least one energy beam, which build material layers can be consolidated/solidified by means of being irradiated by at least one energy beam in a build area of the apparatus. The build material may be provided as a powder, for instance. The build material may be or comprise a ceramic, a polymer, or a metal, for instance. The energy beam may be an electron beam or a laser beam, for instance. The apparatus may be implemented as a selective laser sintering apparatus, a selective laser melting apparatus, or a selective electron beam melting apparatus, for instance. Yet, it is also conceivable that the apparatus is implemented as a binder jetting apparatus, particularly a metal binder jetting apparatus, for instance.

The apparatus comprises a build area or build plane, respectively. The build area can be defined as the area in which the successive layerwise selective irradiation and consolidation of build material layers can take place or takes place during operation of the apparatus. The build area is typically disposed in an inertizable or inert process chamber of the apparatus. The build area typically extends in or parallel to a bottom wall of the process chamber of the apparatus. The build area may have a square or rectangular shape, for instance.

The apparatus comprises a number of functional devices which are operable during its operation. Each functional device may comprise a number of functional units. Examples of respective functional devices are given below in more detail.

A first functional device is a first build material supply device configured to supply an amount, particularly a specific amount, of build material which is to be applied in the build area of the apparatus by means of a first build material application device. The first build material supply device thus, is operable to supply an amount, particularly a specific amount, of build material which is required for forming a build material layer which is to be selectively irradiated and consolidated in the build area during operation of the apparatus. The first build material supply device typically comprises a supply area (first supply area) in which the build material suppliable or supplied by the first build material supply device is suppliable or supplied during operation of the apparatus. The dimensions of the first supply area, i.e. particularly the dimensions of the first supply area in a direction transverse to the direction of build material application of the first build material application device, may be adapted to the dimensions of the build area, i.e. particularly the dimensions of the build area in a direction transverse to the direction of build material application by the first build material application device. The first supply area may have a square or rectangular shape, for instance.

The first build material supply device may comprise a build material storage unit comprising at least one, particularly chamber- or container-like, build material storage element configured to store build material which is suppliable from the first build material supply device. The build material storage element may comprise a, particularly vertically, moveably supported build material supply element configured to supply an amount, particularly a specific amount, of build material to the first supply area by a respective motion in a, typically vertical, build material supply direction. The build material supply element, which may be embodied as a plate, is typically arranged inside the build material receiving volume of the build material storage element. The build material receiving volume thus, typically communicates with the first supply area. As is clear from above, the build material storage element of the build material storage unit of the first build material supply device may comprise a first build material receiving volume.

The first build material supply device may have a modular configuration and may thus, be deemed or denoted as a first build material supply module.

The first build material supply device may comprise connection interfaces, i.e. particularly mechanical connection interfaces, allowing for a, particularly detachable, connection of the first build material supply device to the process chamber of the apparatus.

A second functional device is a first build material application device configured to apply an amount, particularly a specific amount, of build material supplied by the first build material supply device in the build area of the apparatus. The first build material application device thus, serves for forming build material layers which are to be selectively irradiated and consolidated in the build area during operation of the apparatus. The first build material application device is typically assigned to the first build material supply device and vice versa.

A third functional device is a second build material supply device configured to supply an amount, particularly a specific amount of build material which is to be applied in the supply area of the first build material supply device by means of a second build material application device. The second build material supply device thus, is operable to supply an amount, particularly a specific amount, of build material which is to be supplied to the first build material supply device. This amount of build material may correspond to an amount of build material required for forming a build material layer which is to be selectively irradiated and consolidated in the build area during operation of the apparatus and/or may correspond to an amount of build material required for (re)filling the first build material supply device, i.e. particularly the build material receiving volume of the build material storage element. The second build material supply device typically comprises a supply area (second supply area) in which the build material suppliable or supplied by the second build material supply device is supplied during operation of the apparatus. The dimensions of the second supply area, i.e. particularly the dimensions of the second supply area in a direction parallel to the direction of build material application by the first build material application device, may be adapted to the dimensions of the first supply area, i.e. particularly the dimensions of the first supply area in a direction transverse to the direction of build material application by the first build material application device. The second supply area may have a square or rectangular shape, for instance.

The second build material supply device may comprise a build material storage unit comprising at least one, particularly chamber- or container-like, build material storage element configured to store build material which is suppliable from the second build material supply device. The build material storage element may comprise a, particularly vertically, moveably supported build material supply element configured to supply an amount, particularly a specific amount, of build material to the second supply area. The build material supply element, which may be embodied as a plate, is typically arranged inside the build material receiving volume of the build material storage element. The build material receiving volume thus, typically communicates with the second supply area. As is clear from above, the build material storage element of the build material storage unit of the second build material supply device may comprise a second build material receiving volume. The second build material receiving volume may be the same or different to the first build material receiving volume.

The second build material supply device may also have a modular configuration and may thus, be deemed or denoted as a first build material supply module.

The second build material supply device may also comprise connection interfaces, i.e. particularly mechanical connection interfaces, allowing for a, particularly detachable, connection of the second build material supply device to the process chamber of the apparatus.

A fourth functional device is a second build material application device configured to apply an amount, particularly a specific amount, of build material supplied by the second build material supply device to the first supply area of the first build material supply device. The second build material application device thus, serves for supplying build material from the second build material supply device to the first build material supply device, i.e. particularly from the second supply area to the first supply area. The second build material application device is typically assigned to the second build material supply device and vice versa.

Providing a second build material application device and a second build material application device in the above described manner, allows for build material supply approaches with increased efficiency. Particularly, interruptions of additive build processes due to changes of the first build material supply device, particularly when a build material storage unit of the first build material supply device is empty, are avoided.

The first and second build material supply devices and the first and second build material application devices may together form a build material application arrangement. The apparatus may thus, comprise a build material application arrangement comprising at least a respective first build material supply device, a respective first build material application device, a respective second build material supply device, and a respective second build material application device.

In addition to the functional devices described above, i.e. the first and second build material supply device and first and second build material application devices, the apparatus typically comprises further functional devices An exemplary further functional device is an irradiation device adapted to successively selectively irradiate and consolidate respective build material layers applied in the build area of the apparatus with at least one energy beam, e.g. an electron beam or a laser beam. A respective irradiation device may comprise an energy beam generation unit configured to generate at least one energy beam, e.g. a laser beam generating unit or an electron beam generating unit, and/or a beam deflection unit configured to deflect at least one energy beam to diverse positions in the build area, e.g. a scanning unit and/or a deflection coil unit.

Further additional functional devices are conceivable.

The first build material application device may comprise at least one (first) build material application element moveably supported relative to the first build material supply device in a first motion path, in which the build material application element is moveable or moved across the first supply area and the build area of the apparatus. The first build material application element may thus, be moved at least across the supply area of the first build material supply device and the build area of the apparatus so as to form a build material layer which is to be selectively irradiated and consolidated by means of the at least one energy beam in the build area of the apparatus. The first build material application element typically can be moved across the build area of the apparatus.

The first build material application element may be built as or comprise a recoating element, e.g. a recoating blade, for instance. Yet, other embodiments of a first build material application element are conceivable. As such, a first build material application element may be built as or comprise a build material chamber having at least one, particularly gate-like, opening through which build material may be output from the build material chamber. The build material chamber may comprise at least one closing element allocated to the at least one opening of the chamber so as to concertedly open or close the opening of the build material chamber.

The second build material application device may comprise at least one (second) build material application element moveably supported relative to the second build material supply device in a second motion path, in which the build material application element is moveable or moved across the supply area of the second build material supply device and the supply area of the first build material supply device. The second build material application element may thus, be moved at least across the supply area of the second build material supply device and the supply area of the first build material supply device so as to supply build material from the second build material supply device to the first build material supply device which build material is to be applied in the build area of the apparatus by means of the first build material application device. The second build material application element typically cannot be moved across the build area of the apparatus.

The second build material application element may also be built as or comprise a recoating element, e.g. a recoating blade, for instance. Yet, other embodiments of a second build material application element are conceivable. As such, a second build material application element may also be built as or comprise a build material chamber having at least one, particularly gate-like, opening through which build material may be output from the build material chamber. The build material chamber may comprise at least one closing element allocated to the at least one opening of the chamber so as to concertedly open or close the opening of the build material chamber.

As indicated above, the first motion path may at least extend across the supply area of the first build material supply device and the build area of the apparatus and the second motion path may at least extend across the supply area of the second build material supply device and the supply area of the first build material supply device.

In either case, the first motion path typically extends in a first spatial direction and the second motion path extends in a second spatial direction different from the first spatial direction. The first motion path and the second motion path are thus, typically not the same. Particularly, the first motion path and the second motion path are not parallel. Especially, the first motion path and the second motion path may be orthogonal.

The second build material supply device, particularly the supply area of the second build material supply device, may be arranged in a lateral arrangement, particularly in an orthogonal arrangement, relative to the first build material supply device, particularly the supply area of the first build material supply device. This arrangement allows for a compact arrangement particularly of the first and second build material supply device allowing for efficiently using available space, particularly in a direction transverse to the direction of build material application by the first build material application device, in the process chamber of the apparatus.

The apparatus may further comprise a hardware- and/or software implemented control device configured to control operation of the first and second build material application devices, particularly the motions of the respective build material application elements of the first and second build material application devices. Control of the first and second build material application devices typically comprises control of drive units, e.g. drive motors, associated with the first and second build material application element so as to generate a respective drive force which, when applied to the respective build material application elements, results in a motion of the build material application elements along their respective motion paths.

The control unit may be particularly, configured to control a motion and/or position of the build material application element of the second build material application device under consideration of a motion and/or position of the build material application element of the first build material application device and vice versa.

As such, the control unit may be configured to control a motion of the build material application element of the first build material application device from a start position of the build material application element in which the build material application element is positioned relative to the supply area of the first build material supply device before starting a build material application motion allowing for applying build material in the build area of the apparatus towards an end position of the build material application element in which the build material application element, particularly after having crossed the first supply area and the build area of the apparatus, is positioned relative to the supply area of the first build material application device after completing a respective build material application motion. A respective start position of the first build material application element may be a position in which the first build material application element is positioned at a (free) lateral edge of the first supply area, i.e. particularly a lateral edge of the first supply area not adjacent to a lateral edge of the second supply area.

Additionally or alternatively, the control unit may be configured to control a motion of the build material application element of the second build material application device from a start position of the build material application element in which the build material application element is positioned relative to the supply area of the second build material supply device before starting a build material supply motion allowing for supplying build material to the supply area of the first build material supply device towards an end position of the build material application element in which the build material application element, particularly after having crossed the second supply area and the first supply area, is positioned relative to the supply area of the second build material application device after completing a respective build material supply motion. A respective start position of the second build material application element may be a position in which the second build material application element is positioned at a (free) lateral edge of the second supply area, i.e. particularly a lateral edge of the second supply area not adjacent to a lateral edge of the first supply area.

The control unit may be configured to initiate a build material application motion of the build material application element of the first build material application device and a build material supply motion of the build material application element of the second build material application device at the same time. Initiating the build material application motion of the first build material application element and the second build material application element, particularly from respective start positions, at the same time can increase efficiency of the build material supply and application process.

Generally, the first and the second build material application element may be moved dependent or independent from each other.

The control unit is typically, also configured to control operation of the first and second build material supply devices.

A further aspect of the present invention refers to a build material application arrangement for an apparatus, particularly an apparatus as described herein, for additively manufacturing a three-dimensional object by means of successive layerwise selective irradiation and consolidation of layers of build material by means of at least one energy beam in a build area of the apparatus. The build material application arrangement comprises at least: a first build material supply device, the first build material supply device being configured to supply an amount of build material which is to be applied in the build area of the apparatus by means of a first build material application device configured to apply an amount of build material in the build area of the apparatus; a first build material application being configured to apply an amount of build material in the build area of the apparatus; a second build material supply device configured to supply an amount of build material which is to be applied in a supply area of the first build material supply device by means of a second build material application device configured to apply an amount of build material in the supply area of the first build material supply device; and a second build material application device configured to apply an amount of build material to the supply area of the first build material supply device.

A further aspect of the present invention refers to a method for applying an amount of build material in a build area of an apparatus for additively manufacturing a three-dimensional object, particularly an apparatus as described herein, so as to form a build material layer which is to be selectively irradiated and consolidated by means of at least one energy beam. A build material application arrangement as described herein may be used for performing the method.

All annotations referring to the apparatus also apply to the build material application arrangement and/or to the method.

Exemplary embodiments of the invention are described with reference to the Figures. FIG. 1 shows a principle drawing of an exemplary embodiment of an apparatus 1 for additively manufacturing one or more three-dimensional objects 2, e.g. technical components, by means of successive layerwise selective irradiation and accompanying consolidation of build material layers 3 of a build material 4 which can be consolidated by means of at least one energy beam 5 according to an exemplary embodiment. The build material 4 can be a metal powder, for instance. The energy beam 5 can be an electron beam or a laser beam, for instance. The apparatus 1 may be embodied as a selective electron beam melting apparatus or as a selective laser melting apparatus, for instance.

The apparatus 1 comprises a number of functional devices which are operable and operated during its operation. Each functional device may comprise a number of functional units. Operation of the functional devices and the entire apparatus 1, respectively is controlled by a hardware- and/or software embodied (central) control device 6.

Exemplary functional devices of the apparatus 1 are an irradiation device 7, a first build material supply device 8, a first build material application device 9, a second build material supply device 10 (see FIG. 2, 3), a second build material application device 11 (see FIG. 2, 3), and the control device 6. Further functional devices of the apparatus 1 may be provided even though not depicted in the Fig.

The irradiation device 7 is configured to selectively irradiate and thereby, consolidate respective build material layers 3 which have been applied in the build area BA of the apparatus 1 by means of the first build material application device 9 with at least one energy beam 5. The irradiation device 7 may at least comprise a beam generating unit (not shown) configured to generate the at least one energy beam 5. The irradiation device 7 can comprise a beam deflecting unit (not shown), e.g. a scanning unit, configured to deflect the at least one energy beam 5 to diverse positions within the build area BA of the apparatus 1.

Figure 2:
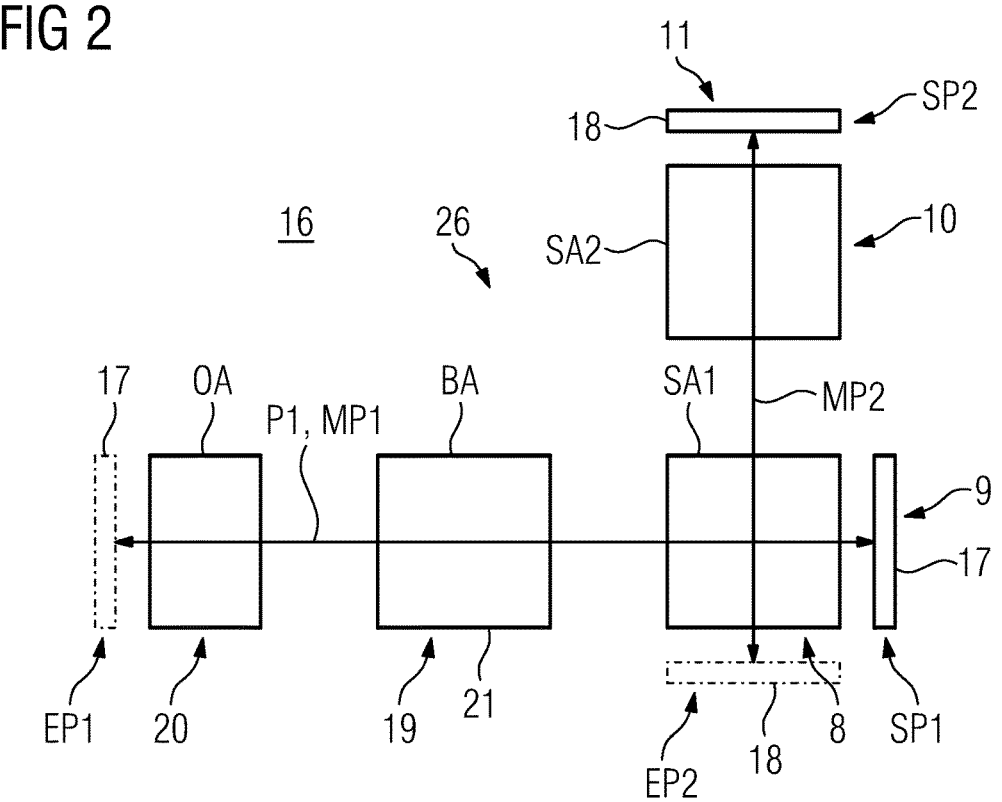
FIG. 2 shows a principle drawing of a build material application arrangement according to an exemplary embodiment in a top-view.
Figure 5:
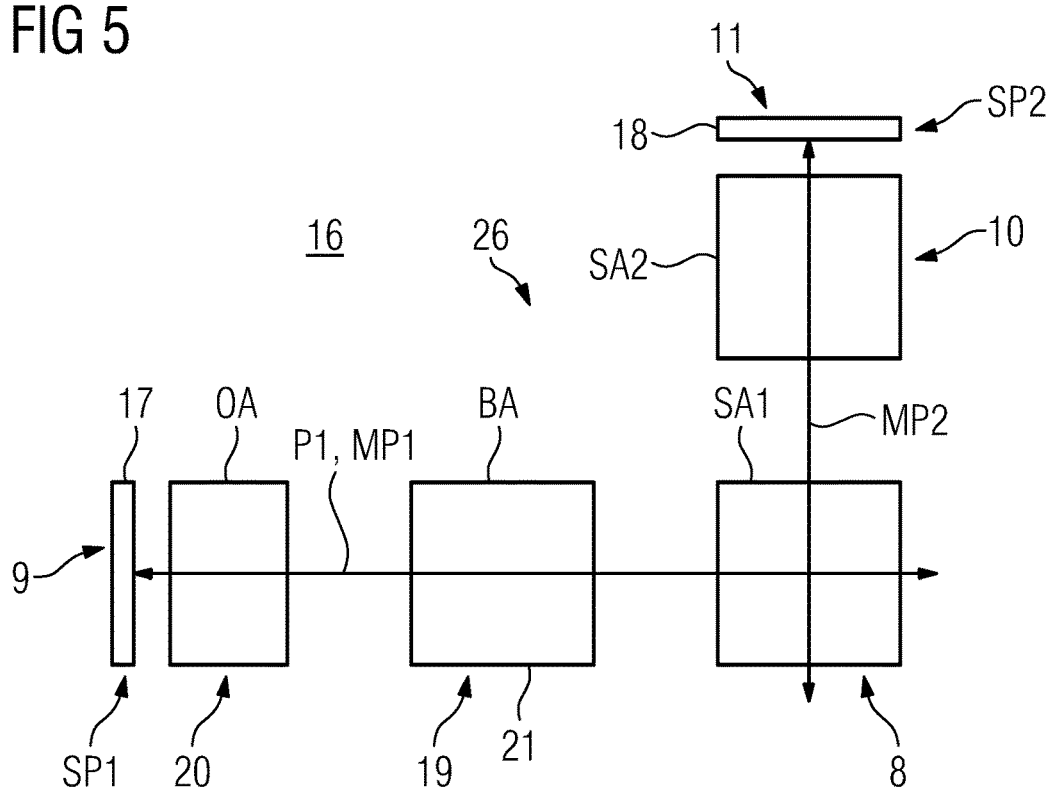
FIG. 5 shows a principle drawing of a build material application arrangement according to an exemplary embodiment in a top-view.

As is discernible from FIG. 2, 3, the build area BA may have a square or rectangular shape.

The first build material supply device 8 is configured to supply an amount, particularly a specific amount, of build material 4 which is to be applied in the build area BA of the apparatus 1 by means of the first build material application device 9. The first build material supply device 8 thus, is operable to supply an amount, particularly a specific amount, of build material 4 which is required for forming a build material layer 3 which is to be selectively irradiated and consolidated in the build area BA during operation of the apparatus 1. The first build material supply device 8 comprises a first supply area SA1 in which the build material 4 suppliable or supplied by the first build material supply device 8 is suppliable or supplied during operation of the apparatus 1. As is apparent from FIG. 2, 3, the dimensions of the first supply area SA1, i.e. particularly the dimensions of the first supply area SA 1 in a direction transverse to the direction of build material application (indicated by arrow P1) of the first build material application device 9, may be adapted to the dimensions of the build area BA, i.e. particularly the dimensions of the build area BA in a direction transverse to the direction of build material application by the first build material application device 9. As is discernible from FIG. 2, 3, the first supply area SA1 may have a square or rectangular shape.

The first build material supply device 8 comprises a build material storage unit 12 comprising a chamber- or container-like build material storage element 13 configured to store build material 4 which is suppliable from the first build material supply device 8 in a first build material receiving volume 15. The build material storage element 13 comprises a vertically moveably supported build material supply element 14 configured to supply an amount, particularly a specific amount, of build material 4 to the first supply area SA1 by a respective motion in a vertical build material supply direction. The build material supply element 14, which may be embodied as a plate, is arranged inside the first build material receiving volume 15 of the build material storage element 13. The build material receiving volume 15 thus, communicates with the first supply area SA1.

The first build material supply device 8 has a modular configuration and may thus, be deemed or denoted as a first build material supply module.

The first build material supply device 8 comprises connection interfaces (not explicitly shown), i.e. particularly mechanical connection interfaces, allowing for a, particularly detachable, connection of the first build material supply device 8 to the process chamber 16 of the apparatus 1, i.e. particularly to the bottom of the process chamber 16 of the apparatus 1.

The first build material application device 9 is configured to apply an amount, particularly a specific amount, of build material 4 supplied by the first build material supply device 8 in the build area BA of the apparatus 1. The first build material application device 9 thus, serves for forming build material layers 3 which are to be selectively irradiated and consolidated in the build area BA during operation of the apparatus 1. The first build material application device 9 is assigned to the first build material supply device 8 and vice versa.

The first build material application device 9 comprises a first build material application element 17 moveably supported relative to the first build material supply device 8 in a first motion path MP1, in which the first build material application element 17 is moveable or moved across the first supply area SA1 and the build area BA of the apparatus 1. The first build material application element 17 may thus, be moved at least across the first supply area SA1 and the build area BA of the apparatus 1 so as to form a build material layer 3 which is to be selectively irradiated and consolidated by means of the energy beam 5 in the build area BA of the apparatus 1. As is apparent from FIG. 1, the first build material application element 17 can be moved across the build area BA of the apparatus 1.

The first build material application element 17 may be built as or comprise a recoating element, e.g. a recoating blade, for instance. Yet, other embodiments of the first build material application element 17 are conceivable. As such, the first build material application element 17 may be built as or comprise a build material chamber (not shown) having at least one, particularly gate-like, opening through which build material 4 may be output from the build material chamber. The build material chamber may comprise at least one closing element allocated to the at least one opening of the chamber so as to concertedly open or close the opening of the build material chamber.

The second build material supply device 10 is configured to supply an amount, particularly a specific amount of build material 4 which is to be applied in the first supply area SA1 by means of the second build material application device 11. The second build material supply device 10 thus, is operable to supply an amount, particularly a specific amount, of build material 4 which is to be supplied to the first build material supply device 8. This amount of build material 4 may correspond to an amount of build material 4 required for forming a build material layer 3 which is to be selectively irradiated and consolidated in the build area BA during operation of the apparatus 1 and/or may correspond to an amount of build material 4 required for (re)filling the first build material supply device 8, i.e. particularly the build material receiving volume 15 of the first build material storage element 13. The second build material supply device 10 comprises a second supply area SA2 in which the build material 4 suppliable or supplied by the second build material supply device 10 is supplied during operation of the apparatus 1. As is apparent from FIG. 2, 3, the dimensions of the second supply area SA2, i.e. particularly the dimensions of the second supply area SA2 in a direction parallel to the direction of build material application (see arrow P1) by the first build material application device 9, may be adapted to the dimensions of the first supply area SA1, i.e. particularly the dimensions of the first supply area SA1 in a direction transverse to the direction of build material application by the first build material application device 9. As is apparent from FIG. 2, 3, the second supply area SA2 may have a square or rectangular shape, for instance.

Similar to the first build material supply device 8, the second build material supply device 10 comprises a build material storage unit (not shown, but having the same configuration as the first build material storage unit 12) comprising a chamber- or container-like build material storage element configured to store build material 4 which is suppliable from the second build material supply device 10 in second build material receiving volume. The build material storage element comprises a vertically moveably supported build material supply element configured to supply an amount, particularly a specific amount, of build material 4 to the second supply area SA2. The build material supply element, which may be embodied as a plate, is arranged inside the second build material receiving volume of the build material storage element. The build material receiving volume thus, communicates with the second supply area SA2.

The second build material supply device 11 may also have a modular configuration and may thus, be deemed or denoted as a first build material supply module.

The second build material supply device 10 also comprises connection interfaces (not explicitly shown), i.e. particularly mechanical connection interfaces, allowing for a, particularly detachable, connection of the second build material supply device 10 to the process chamber 16 of the apparatus 1, i.e. particularly to the bottom of the process chamber 16 of the apparatus 1.

The second build material application device 11 is configured to apply an amount, particularly a specific amount, of build material 4 supplied by the second build material supply device 10 to the first supply area SA1 of the first build material supply device 8. The second build material application device 11 thus, serves for supplying build material 4 from the second build material supply device 10 to the first build material supply device 8, i.e. particularly from the second supply area SA2 to the first supply area SA1. The second build material application device 11 is assigned to the second build material supply device 10 and vice versa.

The second build material application device 11 comprises a second build material application element 18 moveably supported relative to the second build material supply device 10 in a second motion path MP2, in which the second build material application element 18 is moveable or moved across the second supply area SA2 and the first supply area SA1. The second build material application element 18 may thus, be moved at least across the second supply area SA2 and the first supply area SA1 so as to supply build material 4 from the second build material supply device 10 to the first build material supply device 8 which build material 4 is to be applied in the build area BA of the apparatus 1 by means of the first build material application device 9. The second build material application element 18 cannot be moved across the build area BA of the apparatus 1.

The second build material application element 18 may also be built as or comprise a recoating element, e.g. a recoating blade, for instance. Yet, other embodiments of the second build material application element 18 are conceivable. As such, the second build material application element 18 may also be built as or comprise a build material chamber having at least one, particularly gate-like, opening through which build material 4 may be output from the build material chamber. The build material chamber may comprise at least one closing element allocated to the at least one opening of the chamber so as to concertedly open or close the opening of the build material chamber.

The first and second build material supply devices 8, 10 and the first and second build material application devices 9, 11 may together form a build material application arrangement 26.

In addition to the modular first and second build material supply devices 8, 10, the apparatus 1 may further comprise a modular build chamber device 19 defining the build area BA and a modular overflow device 20 (see FIG. 1).

The build chamber device 19 comprise a chamber—or container—like build chamber element 21 configured to receive the object 2 which is to be additively manufactured in a build volume 23. The build chamber element 21 may comprise a, particularly vertically, moveably supported object supporting element 22 configured to support the object 2 which is to be additively manufactured. The object supporting element 22, which may be embodied as a plate, is arranged inside the build volume 23 of the build chamber element 21. The build volume 23 thus, communicates with the build area BA.

The overflow device 20 comprise a chamber—or container—like build material receiving chamber element 24 configured to receive non-consolidated build material 4 in a build material receiving volume 25. The overflow device 20 comprises an opening defining an overflow area OA.

Referring back to FIG. 2, 3, it is apparent that the first motion path MP1 extends in a first spatial direction and the second motion path MP2 extends in a second spatial direction different from the first spatial direction. The first motion path MP1 and the second motion path MP2 are thus, not the same. According to the exemplary embodiments of the Fig, the first motion path MP1 and the second motion path MP2 are be orthogonal.

The orthogonal extension of the first and second motion paths MP1, MP2 originate from that the second build material supply device 10, i.e. particularly the second supply area SA2, is arranged in a lateral arrangement, particularly in an orthogonal arrangement, relative to the first build material supply device 8, i.e. particularly the first supply area SA1.

The control device 6 is configured to control operation of the first and second build material application devices 9, 11, particularly the motions of the respective build material application elements 17, 18 of the first and second build material application devices 9, 11. The control thus, typically comprises control of drive units (not shown), e.g. drive motors, associated with the build material application elements 17, 18 so as to generate a respective drive force which, when applied to the build material application elements 17, 18, results in a motion of the build material application elements 17, 18 along their respective motion paths MP1, MP2.

The control unit 6 may be particularly, configured to control a motion and/or position of the second build material application element 18 under consideration of a motion and/or position of the first build material application element 17 and vice versa.

As such, the control unit 6 may be configured to control a motion of the first build material application element 17 from a start position SP1 of the first build material application element 17 in which the first build material application element 17 is positioned relative to the first supply area SA1 before starting a build material application motion allowing for applying build material 4 in the build area BA of the apparatus 1 towards an end position EP1 (indicated by dotted lines in FIG. 2) of the first build material application element 17 in which the first build material application element 17 after having crossed the first supply area SA1 and the build area BA of the apparatus 1 is positioned relative to the first supply area SA1 after completing a respective build material application motion. As is apparent from FIG. 2, the start position SP1 of the first build material application element 17 may be a position in which the first build material application element 17 is positioned at a (free) lateral edge of the first supply area SA1, i.e. particularly a lateral edge of the first supply area SA1 not adjacent to a lateral edge of the second supply area SA2.

The control unit 6 further may be configured to control a motion of the second build material application element 18 from a start position SP2 of the second build material application element 18 in which the second build material application element 18 is positioned relative to the second supply area SA2 before starting a build material supply motion allowing for supplying build material 4 to the first supply area SA1 towards an end position EP2 (indicated by dotted lines in FIG. 2) of the second build material application element 18 in which the second build material application element 18 after having crossed the second supply area SA2 and the first supply area SA1 is positioned relative to the second supply area SA2 after completing a respective build material supply motion. As is apparent from FIG. 2, a respective start position of the second build material application element 18 may be a position in which the second build material application element 18 is positioned at a (free) lateral edge of the second supply area SA2, i.e. particularly a lateral edge of the second supply area SA2 not adjacent to a lateral edge of the first supply area SA1.

The control unit 6 may be configured to initiate a build material application motion of the first build material application element 17 and a build material supply motion of the second build material application element 18 at the same time. Initiating the build material application motion of the first build material application element 17 and the second build material application element 18, particularly from respective start positions SP1, SP2, at the same time can increase efficiency of the build material supply and application process.

The control unit 6 is also configured to control operation of the first and second build material supply devices 8, 10 which typically results in controlling the motion of the respective vertically moveably supported build material supply elements 14.

The apparatus 1 and particularly, the build material application arrangement 26 allows for implementing a method for applying an amount of build material 4 in a build area BA of a respective apparatus 1 so as to form a build material layer 3 which is to be selectively irradiated and consolidated by means of at least one energy beam 5.

FIG. 2-6 show an implementation of an exemplary embodiment of the method. As such, an exemplary embodiment of the method may comprise the following steps.

In a first step of the method, shown in FIG. 2, the first and second build material application elements 17, 18 are positioned at their respective start positions SP1, SP2.

In a second step of the method, shown in FIG. 3, the first build material application element 17 has started its motion along the first motion path MP1, whereby it has already crossed the first supply area SA1. Likewise, the second build material application element 18 has started its motion along the second motion path MP2, whereby it has already crossed the second supply area SA2.

In a third step of the method, shown in FIG. 4, the first build material application element 17 has continued its motion along the first motion path MP1, whereby it has additionally crossed the build area BA. Likewise, the second build material application element 18 has continued its motion along the second motion path MP2, whereby it has additionally crossed the first supply area SA1 such that the second build material application element 18 has reached its end position EP2. While crossing the first supply area SA1, the second build material application element 18 has supplied build material 4 to the first supply area SA1 so as to fill In a fourth step of the method, shown in FIG. 5, the first build material application element 17 has continued its motion along the first motion path MP1, whereby it has additionally crossed the overflow area OA such that the first build material application element 17 has reached its end position EP1, whereas the second build material application element 18 has already returned to its start position SP2.

Figure 6:
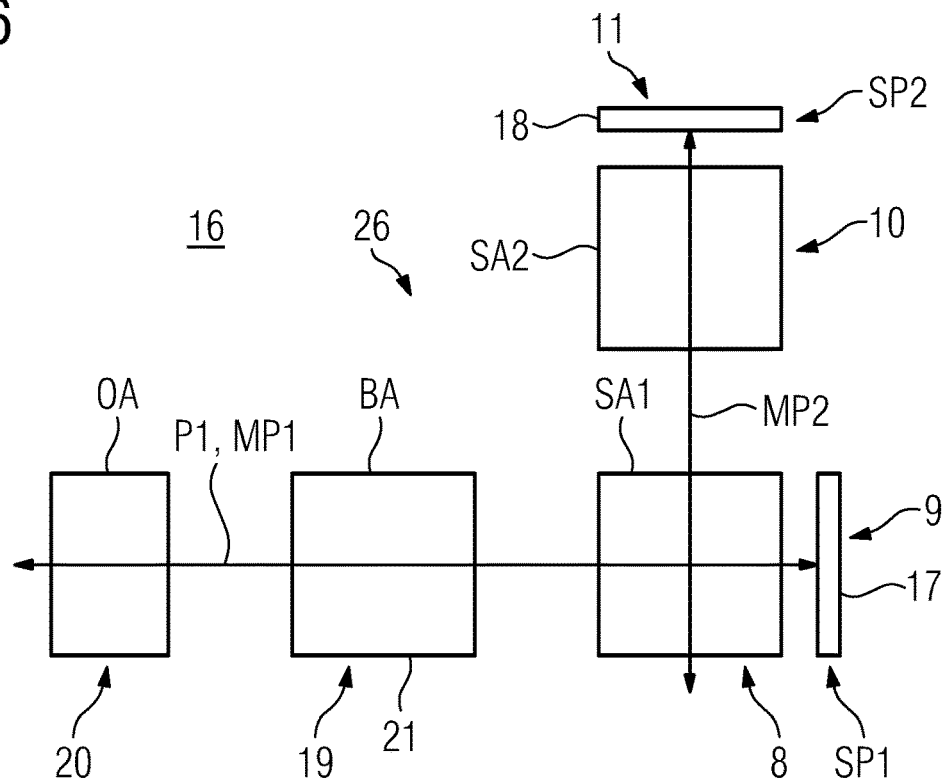
FIG. 6 shows a principle drawing of a build material application arrangement according to an exemplary embodiment in a top-view.

In a fifth step of the method, shown in FIG. 6, also the first build material application element 17 has returned to its start position SP1.

The steps are typically, repeated for every build material layer 3 which is to be selectively irradiated and consolidated during operation of the apparatus 1.

Single, a plurality, or all features mentioned in context with a specific embodiment may also apply to other embodiments. Hence, a single, a plurality, or all features mentioned in context with a specific embodiment may be combined with at least one feature of another specific embodiment.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for additively manufacturing a three-dimensional object formed by successive layerwise selective irradiation and consolidation of build material layers by at least one energy beam in a build area of the apparatus, the apparatus comprising:
   a first build material supply device comprising a first supply area, the first build material supply device configured to supply an amount of build material to a first build material application device;
   the first build material application device configured to move in a first motion path across the first supply area and the build area to apply an amount of build material in the build area of the apparatus, the build area of the apparatus is crossed by the first build material application device moving in the first motion path;
   a second build material supply device comprising a second supply area, the second build material application device configured to supply an amount of build material to a second build material application device; and
   the second build material application device configured to move in a second motion path across the second supply area to apply an amount of build material to the first supply area of the first build material supply device, the build area of the apparatus is not crossed by the second build material application device moving in the second motion path.

2. The apparatus according to claim 1, wherein the second build material supply device is arranged in a lateral arrangement relative to the first build material supply device.

3. The apparatus according to claim 1, wherein the first build material application device is configured to apply the build material from the first build material supply device and the second build material application device is configured to apply the build material from the second build material supply device.

4. The apparatus according to claim 1, wherein the first build material application device comprises at least one build material application element moveably supported relative to the first build material supply device in the first motion path to move across the first supply area of the first build material supply device and the build area of the apparatus.

5. The apparatus according to claim 4, wherein the second build material application device comprises at least one build material application element moveably supported relative to the second build material supply device in the second motion path to move across the second supply area of the second build material supply device and the first supply area of the first build material supply device.

6. The apparatus according to claim 5, wherein the first motion path extends in a first spatial direction and the second motion path extends in a second spatial direction different from the first spatial direction.

7. The apparatus according to claim 5, wherein the first motion path at least extends across the first supply area of the first build material supply device and the build area of the apparatus and the second motion path at least extends across the second supply area of the second build material supply device and the first supply area of the first build material supply device.

8. The apparatus according to claim 1, further comprising a control device configured to control operation of the first and second build material application devices.

9. The apparatus according to claim 8, wherein the control device is configured to control a motion of the at least one build material application element of the second build material application device depending on a motion of the at least one build material application element of the first build material application device.

10. The apparatus according to claim 9, wherein the control device is configured to control a motion of the at least one build material application element of the first build material application device from a start position of the at least one build material application element in which the at least one build material application element is positioned to cross the first supply area of the first build material supply device before starting a build material application motion allowing for applying build material in the build area of the apparatus towards an end position of the at least one build material application element in which the at least one build material application element is positioned having crossed the first supply area of the first build material supply device and the build area after completing a respective build material application motion.

11. The apparatus according to claim 10, wherein the control device is configured to control a motion of the at least one build material application element of the second build material application device from a start position of the at least one build material application element in which the at least one build material application element is positioned to cross the second supply area of the second build material supply device before starting a build material supply motion allowing for supplying build material to the first supply area of the first build material supply device towards an end position of the at least one build material application element in which the at least one build material application element is positioned having crossed the second supply area of the second build material supply device and the first supply area of the first build material supply device after completing a respective build material supply motion.

12. The apparatus according to claim 11, wherein the control device is configured to initiate a build material application motion of the at least one build material application element of the first build material application device and a build material supply motion of the at least one build material application element of the second build material application device at the same time.

13. The apparatus according to claim 12, wherein the build material storage element of the build material storage unit of the first build material supply device comprises a first receiving volume of a first build material and the build material storage element of the build material storage unit of the second build material supply device comprises a second receiving volume of a second build material, the second receiving volume of the second build material being same as or different from the first receiving volume of the first build material.

14. The apparatus according to claim 12, wherein the build material storage element of the build material storage unit of the first build material supply device supplies an amount of build material to the first supply area of the first build material supply device via a moveably supported build material supply element.

15. The apparatus according to claim 14, wherein the build material storage element of the build material storage unit of the second build material supply device supplies an amount of build material to the second supply area of the second build material supply device via a moveably supported build material supply element.

16. The apparatus according to claim 1, wherein the first build material supply device comprises a build material storage unit comprising at least one build material storage element configured to store build material supplied from the first build material supply device.

17. The apparatus according to claim 16, wherein the second build material supply device comprises a build material storage unit comprising at least one build material storage element configured to store build material supplied from the second build material supply device.

18. A build material application arrangement for an apparatus for additively manufacturing a three-dimensional object by successive layerwise selective irradiation and consolidation of layers of a build material with at least one energy beam in a build area of the apparatus, the apparatus comprising:
a first build material supply device comprising a first supply area, the first build material supply device configured to supply an amount of build material to a first build material application device, wherein the first build material application device is configured to move in a first motion path across the first supply area and the build area to apply an amount of build material in the build area of the apparatus, the build area of the apparatus is crossed by the first build material application device moving in the first motion path; and
a second build material supply device comprising a second supply area, the second build material application device configured to supply an amount of build material to a second build material application device, wherein the second build material application device is configured to move in a second motion path across the second supply area to apply an amount of build material to the first supply area of the first build material supply device, the build area of the apparatus is not crossed by the second build material application device moving in the second motion path.

19. The build material application arrangement of claim 18, wherein the first build material application device is configured to move in the first motion path simultaneously as the second build material application device is configured to move in the second motion path.

20. A method for applying an amount of build material in a build area of an apparatus for additively manufacturing a three-dimensional object to form a build material layer to be selectively irradiated and consolidated by at least one energy beam, the method comprising: supplying the build material to the build area of the apparatus with the build material application arrangement of claim 18 by moving the first build material application device in the first motion path across the first supply area and the build area to supply the amount of the build material to the build area of the apparatus.

* * * * *